United States Patent [19]

Hanley

[11] 4,219,224
[45] Aug. 26, 1980

[54] CRYOGENIC PIPELINE SYSTEM

[75] Inventor: Bernard C. Hanley, Chestnut Hill, Mass.

[73] Assignee: Foundation Cryogenic Joint Venture, Toronto, Canada

[21] Appl. No.: 893,981

[22] Filed: Apr. 6, 1978

[51] Int. Cl.² .................... F16L 9/18; F16L 59/14
[52] U.S. Cl. .................... 285/47; 138/113; 138/149; 285/DIG. 5
[58] Field of Search ............ 285/47, DIG. 5; 138/113, 149

[56] References Cited

U.S. PATENT DOCUMENTS

| 3,275,345 | 9/1966 | Waldron et al. | 285/47 |
| 3,369,826 | 2/1968 | Boosey et al. | 285/47 |
| 3,865,145 | 2/1975 | McKay et al. | 285/47 X |

FOREIGN PATENT DOCUMENTS 7001185  5/1970  Netherlands .............. 138/149

553389  4/1977  U.S.S.R. ............ 285/DIG. 5 X

Primary Examiner—Thomas F. Callaghan
Attorney, Agent, or Firm—Max Geldin

[57] ABSTRACT

A pipeline system particularly designed for transporting liquefied natural gas (LNG) comprising a plurality of pipe sections connected together as by welding, each section having an outer pipe or jacket and an inner liquid carrier pipe which is in compression when installed and which is secured at opposite end portions to the outer pipe by connector cones, the outer pipe being placed in tension by the connector cones. To reduce the thermal stress in the carrier pipe and heat leak from the outer to the inner pipe, each of the cones is connected to the inner pipe through a fiber reinforced plastic insulating member, preferably a polyester fiberglass cylinder. Thermal insulation such as polyurethane foam is placed in the annular space between the inner and outer pipes for further resistance to heat flow into the system.

32 Claims, 9 Drawing Figures

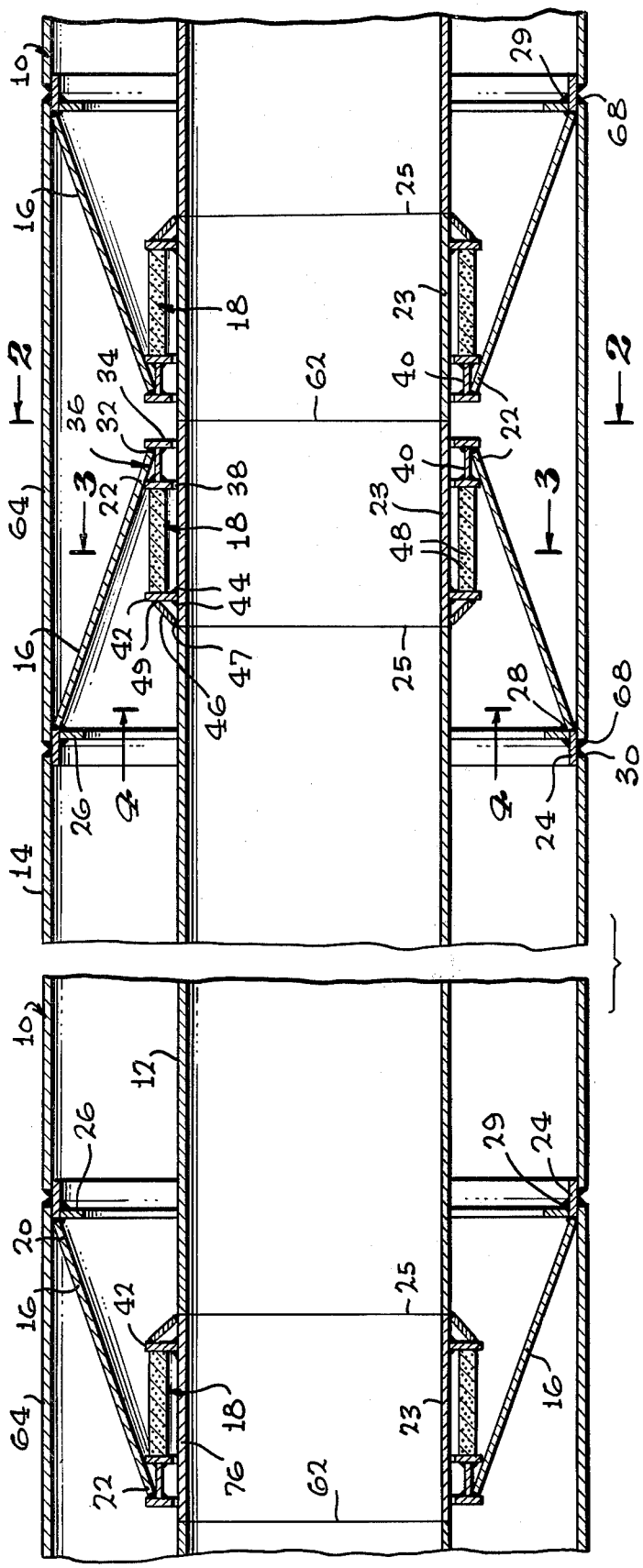

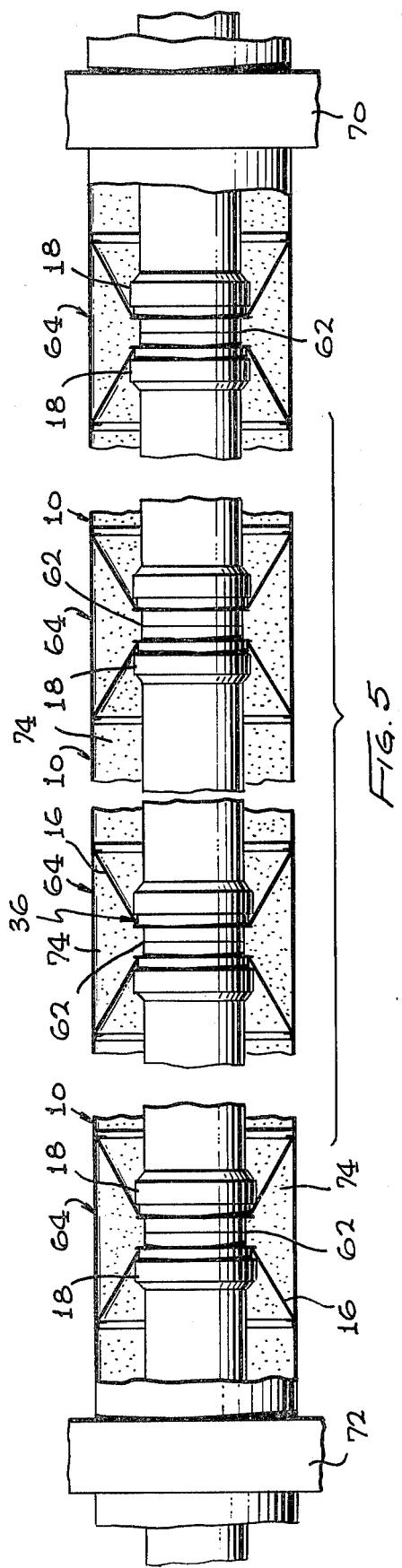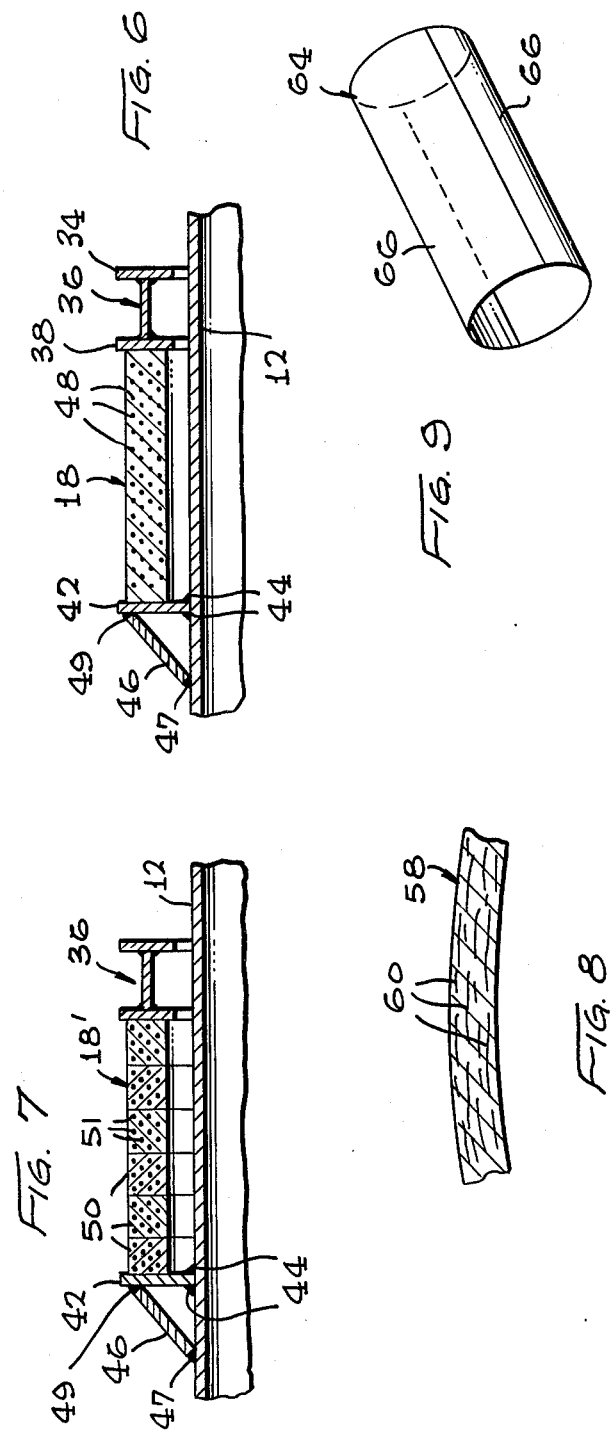

CRYOGENIC PIPELINE SYSTEM

BACKGROUND OF THE INVENTION

This invention relates to pipeline systems particularly designed for transporting very low temperature or cryogenic fluids, especially natural gas, usually essentially in liquid form and termed herein LNG, and is particularly concerned with the provision of a pipeline system of the above type, including means for reducing thermal stress and heat leak in the system during passage of LNG therethrough.

The temperature of liquefied natural gas (LNG) at atmospheric pressure is about $-260°$ F. Only a few materials, such as aluminum or high nickel austenitic stainless steels, 9% nickel steel, or "Cryonic 5" maintain their toughness at this temperature. If restrained at both ends and cooled to $-260°$ F., all of these materials would develop thermal stress as result of contraction, higher than allowable for the design of cryogenic pipe.

Cryogenic piping is normally designed within allowable stress levels by one of two methods. The more usual method is to obtain piping flexibility by change of direction of the piping, such as by means of right angle bends, U-bends or Z-bends. This method uses an increased length of pipe in offset, to reduce the thermal stresses and loads due to temperature cycling. Essentially, the thermal strain is taken up as a bending deflection, with the pipe absorbing the deflection made sufficiently long to keep the bending stresses within allowable limits. The U-bends, or expansion loops, in steam pipes is an example of this method of designing for an allowable amount of thermal strain. The second method is to employ expansion joints which use flexible bellows to compensate for the axial thermal strain. A third method, used only in very special cases, is the use of low expansion coefficient material in the piping. Invar is a high nickel content iron-nickel alloy with a low coefficient of thermal contraction. It has been used for cryogenic piping in cases where offset lengths of piping or bellows were not allowable. It is, however, too costly for most situations. These methods are not acceptable for buried or underwater pipelines.

Moreover, such prior art means for temperature compensation of the LNG line not only are expensive and cumbersome, but also present a potential leakage problem. The situation is compounded where, for example, temperature compensation is required for very long lengths of the order of thousands of feet of LNG pipeline.

To overcome the above disadvantages there has been developed in the prior art the dual concentric prestressed pipeline concept. According to this concept, coaxial inner and outer pipes are provided which are connected together at their ends, with one of the pipes, e.g. the inner pipe, being prestressed and placed under axial compression while the other pipe, e.g. the outer pipe, is placed under axial tension. Illustrative of such prior art are U.S. Pat. No. 3,530,680 to Gardner and U.S. Pat. No. 3,693,665 to Veerling.

An improvement of such dual concentric prestressed pipeline concept is described in U.S. Pat. No. 3,865,145 to McKay et al, and assigned to the same assignee as the present application. The latter patent discloses a pipeline system for transporting LNG comprising an inner pipe and an outer pipe, the outer pipe being disposed concentrically about the inner pipe and a plurality of stress cones in the annular space between the inner and outer pipes, and securing the inner pipe to the outer pipe, and arranged to transfer a compressive load from one pipe to a tension load on the other pipe. An insulator member formed of a material such as Teflon is added at the connection of the stress cones to either the outer or inner pipe. However, it has been found in this design that the stresses in the inner or LNG carrier pipe, and heat leak along the cones are higher than is desirable.

It is an object of the present invention to provide an improved cryogenic pipeline system of the general type described in the above McKay et al U.S. Pat. No. 3,865,145, having reduced stresses, particularly in the inner carrier pipe, and having reduced heat leak between the outer and inner pipes, particularly along the connecting members or cones. Another object is the provision of a pipeline system as noted above, wherein working stresses are within acceptable limits, and are fully predictable, allowing for adequate safety factors. A still further object is to provide a pipeline system of the foregoing type, which is suitable for installation under conditions which essentially eliminate accessibility for maintenance once the installation has been made, that is for use under water or buried, or both. Yet another object is the provision of a pipeline system of the aforementioned type, having suitable insulation to minimize heat absorption and frost heaving of the surrounding fill. Yet another object is to provide a pipeline system of the above type of relatively simple design and fabricated from suitable metals which are commercially available, and which permits facile fabrication of the pipe sections at a factory and only requires assembly by welding of the pipe sections in the field or on site. A still further object is the provision of a pipeline system of the type noted above which is designed to essentially eliminate leaks.

DESCRIPTION OF THE INVENTION

The above objects are achieved according to the invention by providing a pipeline system, particularly designed for transporting a very low temperature or cryogenic fluid, especially liquefied natural gas, comprising an inner pipe as carrier for conveying the cryogenic liquid, and an outer pipe spaced from the inner pipe and positioned concentrically around the inner pipe, and means in the form of connector cones disposed in the annular space between the inner and outer pipes, and securing such pipes in position with respect to each other.

An essential feature of the invention is the provision of a plastic, preferably fiber reinforced, insulating member or laminate, most desirably a polyester fiberglass member or laminate, in the form of an insulating cylinder positioned between and connected to the small end portion of each of the connector cones and the inner pipe. The insulating cylinder is thus positioned in the annular space between the inner and outer pipes, and is mounted coaxially of the inner and outer pipes and spaced from the inner pipe. Such plastic laminate or cylinder has a high coefficient of thermal contraction, particularly between room temperature and the temperature of liquefied natural gas, and generally substantially higher than the inner pipe, and has high compressive strength at low temperature, and high modulus of elasticity. Such properties and the placement of such insulating member between the small end portion of the connector cones and the inner carrier pipe, substantially improves thermal stress on the inner pipe and substantially reduces heat leak from the outer pipe and along the connector cones to the inner carrier pipe.

More specifically, the cryogenic liquid, particularly LNG, pipeline according to the invention is comprised of a plurality of pipe sections, each such section comprising an inner pipe which is prestressed in compression and which is secured at opposite end portions thereof to the outer pipe by means of connector cones. The smaller diameter end portion of each of the cones adjacent the inner pipe, is not directly connected to such inner pipe but is connected to such inner pipe via the above noted fiber reinforced plastic insulator member, and particularly in the form of a cylinder of polyester resin reinforced with glass fibers, positioned within the cone and disposed around the inner pipe and coaxially therewith. The insulating member or cylinder has high compressive strength paticularly in the axial direction of the inner and outer pipes, and provides good thermal resistance to the flow of heat from the outer pipe and the connector cones, to the inner carrier pipe.

The inner or carrier pipe of each of the above pipe sections is prestressed by placing it in compression. This can be accomplished by suitable jacking means, for example. The inner pipe is held in compression by the outer pipe and the cone connectors, and the outer pipe is thus in tension. When the inner pipe is cooled to LNG temperature the thermal contraction changes the stress in the inner pipe from compression to tension. However, the stress in the outer pipe and the connector cones does not pass through a reversal from tension to compression, but always remain in tension.

The above noted prestressed pipe sections are welded together by means of field welds to form the desired overall length of pipeline, and one end of the pipeline is anchored, e.g. adjacent an LNG storage tank, and the other end of the pipeline is also anchored, e.g. adjacent a dock for unloading an LNG tanker.

Further, in connecting adjacent pipe sections together to form the overall pipeline, as previously noted, the end portions of the inner pipes of adjacent pipe sections are connected together as by welding, and the outer pipes are provided with outer pipe covers positioned between and connected to the outer pipes of adjacent pipe sections, such outer covers being subjected neither to a compressive or tensile load after completion of installation.

Further resistance to the flow of heat into the system toward the inner pipe carrying the cryogenic liquid or LNG can be prevented by introducing thermal insulation in the annular space between the inner and outer pipes. Such thermal insulation is preferably of a type, e.g. polyurethane, as described in greater detail below, which also provides lateral support for the inner pipe when it is under compression and thereby aiding to prevent buckling thereof.

The pipeline design of the present invention embodying the feature of a fiber reinforced plastic insulating member or polyester fiberglass laminate in the form of a cylinder, between the connection of one end of the cones with the inner carrier pipe, substantially reduces the thermal stress in the inner carrier pipe, and particularly reduces thermal stress in the unstressed regions of the pipeline adjacent the field weld between the inner pipes of adjacent pipe sections, while reducing the heat flow into the inner pipe along the cones. The fiber reinforced insulating member or cylinder has good compressive load-carrying capacity. The invention design also affords an outer to inner pipe connector in a configuration and employing insulating materials so that the connector load in the anchored pipeline will be reduced as the inner pipe is cooled to cryogenic or LNG temperature.

DETAILED DESCRIPTION OF PREFERRED EMBODIMENTS

The invention will be understood more readily by the detailed description below of certain preferred embodiments, taken in connection with the accompanying drawing wherein:

FIG. 1 is a longitudinal sectional view of one section of a pipeline according to a preferred embodiment of the invention, including a fiber reinforced plastic insulating member or cylinder;

FIG. 2 is a transverse section taken on line 2—2 of FIG. 1;

FIG. 3 is a transverse section taken on line 3—3 of FIG. 1;

FIG. 4 is an end view of the connecting structure for securing the fiber reinforced polyester insulator cylinder to the inner pipe, taken on line 4—4 of FIG. 1;

FIG. 5 shows an LNG pipeline system comprised of a plurality of the pipe sections shown in FIG. 1, the pipeline being anchored at its opposite ends;

FIG. 6 is an enlarged sectional view of the fiber reinforced plastic insulating cylinder and connecting structure, shown in FIG. 1;

FIG. 7 is a modification of the fiber reinforced insulating cylinder shown in FIG. 1;

FIG. 8 illustrates a still further modification of the fiber reinforced plastic insulating member of FIG. 1; and FIG. 9 shows in perspective another structural detail of the pipeline system of FIG. 5.

Referring now to FIGS. 1 to 4 of the drawing, the pipeline system of this preferred embodiment is composed of a plurality of like modular or pipe sections 10, each comprising an inner carrier pipe 12, an outer jacket pipe 14, a pair of connector cones 16 at opposite end portions of the pipe section, and a pair of fiber reinforced plastic insulating members 18. Such insulating members are in the form of a cylinder positioned within the connector cones 16 and disposed in the annular space around the inner pipe and coaxial therewith. The large end, that is the larger diameter end 20 of cones 16, is connected to the outer pipe 14, in a manner described in greater detail hereinafter, and the small end, that is the smaller diameter end 22, of the cones 16 is connected to the insulating member 18, which in turn is connected to the inner carrier pipe 12, as described in greater detail hereinafter. Thus, the outer pipe 14 is disposed concentrically about the inner pipe 12, and such pipes are secured and maintained in such concentric relation by the connector cones 16, via the fiber reinforced plastic insulating member or cylinder 18.

The outer or jacket pipe 14 can be formed of mild or carbon steel such as A 283 Gr B. The inner or carrier pipe 12 should have high strength characteristics at low temperatures, and is preferably composed of nickel steels, e.g. 3%, 5% or 9% nickel steels. However, the outer end portions 23 of the inner pipe 12 are perfectly formed of Incoloy alloy 903 for reasons noted hereinafter, and are welded at 25 to the outer ends of the main portion of pipe 12.

The stress cones 16 which secure the inner pipe 12 to the outer pipe 14 and maintain such pipes in their concentric relation, function to transfer loads from one of the inner and outer pipes to the other, and specifically to transfer a compressive load from the inner pipe 12 to a tension load in the outer pipe 14. The cones 16 also provide a resistant heat path from the outer pipe 14 to the inner pipe 12. It is accordingly preferred that such cones be composed of high strength materials having high modulus or stiffness. Thus, although the cones 16 can be formed from carbon steel such as A 516 carbon steel, preferably the cones are comprised of the above noted nickel steels, such as 5% or 9% nickel steel, or other metals such as stainless steels.

The large ends 20 of the cones 16 abut a collar 24 positioned around the inner periphery of the outer pipe 14 adjacent the ends thereof. A stiffener ring 26 is provided around the inner surface of collar 24 adjacent the large end 20 of the cones, ring 26 being welded at 28 to the inner surfaces of the cone at the connection of the cone to collar 24, ring 26 also being welded at 29 to collar 24. Collar 24 is fitted within the outer pipe 14 and is connected thereto by welding at 30.

The small end 22 of the cone is connected by welding at 32 to one side 34 of a support structure 36 composed of the side members or rings 34 and 38, and a central ring 40, which are connected together by welding. The fiber reinforced plastic insulating member or cylinder 18 is supported on one side by member 38 of the support structure 36, and on the other side by a support ring or ring plate 42 which is welded at 44 around the inner pipe 12. The support structure 36 is not connected to inner pipe 12, and can move axially with respect to the inner pipe. An inclined stiffening brace 46 is welded at one end to the inner pipe 12 and at the other end to the support ring 42, as indicated at 47 and 49, respectively. The fiber reinforced plastic cylinder 18 is thus mounted in spaced relation to the inner pipe 12 and is maintained under a compressive axial load between side 38 of the support structure 36, and the support ring 42. The axial length of the insulating cylinder 18 between members 38 and 42 is substantial in order that when cooled to cryogenic temperatures, the reduction in overall length from thermal contraction of insulating cylinder 18 and support structure 36 is greater than the reduction in overall length of cone 16 from thermal contraction. The net result of these thermal contractions is such that the axial distance from the welds at 44 to the welds at 28 is reduced. Thus, the axial length of insulating cylinder 18 can range from about 25% to about 50% of the axial length of the connector cones 16. The radial thickness of the insulating cylinder 18 depends upon the modulus of elasticity of the insulating material since the mechanical strain must be kept to a minimum. Such radial thickness can range from about 10% to about 25% of the axial length of the insulating cylinder. The cross sectional area of the cylinder 18 should be relatively high to reduce the amount of deflection of such cylinder under the load.

The fiber reinforced plastic insulating member or cylinder 18 is an essential feature of the pipeline structure of the invention. Such insulator member should have a high coefficient of thermal contraction between room temperature and the temperature of liquefied natural gas, at about $-260°$ F., substantially greater, and preferably several times that of the metal of the inner pipe 12. The coefficient of thermal contraction of the insulator member can range from about 0.004 to about 0.010 inches per inch. Such high coefficient of thermal contraction primarily results in substantially reducing the amount of load transmission from the outer pipe to the inner pipe when the inner carrier pipe is substantially reduced in temperature by flow of LNG through it; and also results in substantially reducing heat loss between the outer and inner pipes. The insulator member should also have a high compressive strength at cryogenic temperatures, e.g. ranging from about 6,000 to about 12,000 psi, and relatively high modulus of elasticity, e.g. ranging from about 800,000 to about 2 million psi, e.g. about 1 million psi.

A preferred type of insulator material having the above characteristics according to the invention is fiberglass reinforced polyester resin. The fiber reinforced plastic insulator 18 is preferably in the form of a cylinder, as seen more clearly in FIGS. 3 and 6, the fiber or fiberglass 48 being laid into the cylinder during manufacture so that the fiberglass is disposed substantially parallel to the periphery of the cylinder, and is essentially circumferential, and preferably in the form of a tight circumferential spiral or helix. A fiberglass polyester member or laminate of this type is fabricated by Haysite Corp., a division of Synthane Taylor. The proportion of glass fibers in the insulating member can range from about 30% to about 65% by weight, the remainder being polyester resin. The higher the percentage of fiberglass content, the larger the value of the modulus of elasticity. A glass fiber reinforced polyester laminate particularly suitable for use as the insulator 18 is comprised of 38% by weight Paraplex P-43 polyester resin and 62% by weight "E" glass fibers or cloth. In the case of the polyester resins or laminates reinforced with "E" glass cloth, the low expansion and high modulus of the glass controls the overall expansion of the laminates in the direction parallel to the cloth or fibers. The direction of the compression load, however, is perpendicular to the direction of the fibers, and it is the properties of the laminate in the direction of the load which are of importance in the invention structure.

However, other types of insulating materials and fiber reinforcement can be employed, so long as the insulating member has the above noted thermal contraction and compressive strength characteristics. Thus, for example epoxy resins can be employed, and also boron fibers can be utilized. An epoxy fiberglass member or laminate, for example, is another suitable insulator material for use as the insulator member 18. The insulator member 18 thus can also be made of cast polyester resin or a filled polyester resin employing inorganic material such as chopped fiberglass, calcium carbonate or alumina trihydrate as filler material. However, polyester fiberglass composites or laminates are preferred, particularly with the fiberglass perpendicular to the compressive load.

FIG. 7 illustrates a modification of the form of the fiber reinforced plastic insulator member 18. In FIG. 7 the insulator member 18′ is in the form of a series of rings 50 formed of individual cylinders of polyester resin having embedded therein glass fibers 51, which rings are compressed together between the supporting structure 36 and the support ring 42 to form the insulator cylinder 18′, with the load applied perpendicular to the direction of the glass fibers. The plastic insulator member initially can be in the form of a fiberglass mat reinforcement saturated with polyester resin.

Alternatively, chopped fibers can be embedded, either circumferentially or radially into the resin, so long as the direction of the compressive load is perpendicular to the direction of the glass fibers. Thus, as seen in FIG. 8, the polyester cylinder 58 has random glass fibers 60 embedded circumferentially or radially in the cylinder. Accordingly, a fiber reinforced plastic cylinder can be employed, with the fibers, e.g. glass fibers, either as continuous or chopped fibers, oriented in planes perpendicular to the compressive load.

In fabricating the pipe sections 10 formed of the inner pipe 12, outer pipe 14, connector cones 16 at opposite end portions of the pipe sections and fiberglass reinforced plastic insulator cylinder 18, the cones 16 and insulator cylinders 18 are first assembled and connected to the inner pipe 12 as described above, and such inner pipe section, with the cones 16 and insulator cylinders 18 attached at opposite ends of pipe 12, and with elements 24 and 26 carried by the cones 16, is inserted into the outer pipe 14. The assembly is then inserted in a frame (not shown) and the inner pipe is then placed in compression by the application of hydraulic jacking mechanisms (not shown) applied to the opposite ends of the inner pipe. While under compression, the cylindrical collars 24 at the large end of the cones are welded at 30 to the outer pipe 14, as shown in FIG. 1. The compressive deformation in the inner pipe 12 is greater than the final required deformation by the amount of tensile deformation desired in the outer pipe 14. Upon completion of welding, the jacking load is gradually released, allowing the tensile load in the outer pipe to build up until the compression in the inner pipe is maintained by the tension in the outer pipe. The assembled pipe section 10 is then withdrawn from the frame.

In the resulting pipe section 10, the inner pipe 12 between the opposite ring plates 42 is loaded in compression and the outer pipe 14 is in tension, the fiberglass polyester insulator cylinder 18 is under compression and the connector cones 16 are in tension. The outer opposite end portions 23 of the inner pipe 12 of the pipe section beyond the ring plates 42 remain unprestressed, that is, are not in compression following removal of the jacking mechanisms.

Following prestressing of the pipe sections 10 and assembly thereof as noted above, a plurality of such pipe sections are connected together to form the pipeline system by first forming a field weld as indicated at 62 between adjacent inner pipes 12 of adjacent pipe sections 10. Outer pipe sections or pipe covers 64 are provided, which fit over the outer ends of the cones 16 between the adjacent pipe sections 10. The pipe covers 64 are conveniently in the form of mating half shells 66, viewing FIG. 9, the pipe cover 64 having a diameter equal to the diameter of the outer pipes 14 of the pipe sections 10. The cover pipes 64 are secured to the outer surface of the collars 24 by welding the half sections 60 to such collars, as indicated at 68.

It will be noted that there is essentially no load either compressive or tensile in the outer pipe sections or pipe covers 64 between adjacent pipe sections 10 after completion of the assembly procedure noted above.

Referring to FIG. 5, the assembled pipe sections 10 connected together as noted above are shown mounted between heavy concrete abutments or anchors 70 and 72, one of such abutments 70 being adjacent an LNG storage tank (not shown) and the other abutment 72 being located near a dock for unloading an LNG tanker.

Preferably, insulation indicated generally at 74 is provided in the annular space between inner pipe 12 and outer pipe 14 of pipe sections 10, and also in the annular space provided between the pipe covers 64 and inner pipe 12, between adjacent pipe sections 10. For this purpose, an insulation material is chosen which has low thermal conductivity, and preferably also has relatively high compressive strength characteristics, thereby preventing column buckling of the inner pipe. An example of a suitable type of insulation for this purpose are materials such as polyurethane, which can be provided in the form of precut blocks, or which can be foamed in place. Polyurethane of 3 to 4 lbs. density is a representative material. However, other equivalent insulating materials can be employed, such as expanded cellular polystyrene, such as the material marketed as Styrofoam HD 1435, or as expanded polystyrene beads. Another insulation material which can be employed for this purpose is perlite powder.

Thus it is seen that the pipe sections 10 according to the invention can be connected together in the manner noted above and illustrated in FIG. 5, to form a unitary pipeline system.

When a cryogenic liquid such as LNG is passed through the inner or carrier pipe 12, the stresses in the inner pipe change from the prestressed compression through a reversal to tension. The stress in the connector cones 16 however, never passes through a reversal, and is always in tension with the magnitude of unit stress in psi increasing towards the smaller diameter of the cones with a constant cone thickness. The outer pipe 14, which is constrained at its ends also remains in tension. Actually, the tensile load in the outer pipe increases in proportion to the reduction in temperature of the outer pipe.

The polyester fiberglass cylinder 18 is in series in the load path between the inner and outer pipes of a prestressed pipe section. That is, all the load to maintain the compression preload in the inner pipe 12 must pass through the polyester fiberglass cylinder. For this purpose, two of the important properties of the polyester fiberglass laminate to be considered are the coefficient of contraction and the modulus of elasticity. The larger the coefficient of contraction, the greater the decrease in length when the polyester fiberglass cylinder gets cold when LNG is passed through the inner pipe 12, and the greater the reduction in the outer-to-inner pipe connector load. The modulus of elasticity for the polyester fiberglass laminate should be high so that such cylinder in the outer-to-inner pipe connector will not have too high a deflection under the high connector load.

It will be noted that the direction of loading of the polyester fiberglass cylinder 18 forming the joint between the connector cones 16 and the inner pipe 12, is normal to the direction of the fiberglass 48, that is such loading is parallel to the axis of the pipes 12 and 14, to take advantage of the larger amount of contraction in this direction. The coefficient of contraction of the polyester fiberglass cylinder is higher in this direction than in the direction parallel to the fiberglass 48, which is circumferential.

Therefore, when the polyester fiberglass cylinder 18 cools, the contraction of such cylinder will allow the support rings 42 attached to the carrier or inner pipe 12 of each pipe section to move toward the field weld 62 between adjacent pipe sections 10, and thus reduce the stress in the "un-prestressed" portions 23 of the inner pipe, between the ring plate 42 and the field weld 62 in each pipe section. Thus, it is seen that the fiber reinforced plastic cylinder 18 between the connector cones and the inner pipe of the invention structure, permits a reduction of thermal stress in the unstressed regions 76 of the inner pipe 12 between the end portions of adjacent pipe sections 10, adjacent the field weld 62, and also functions to reduce the heat flow from the outer pipe 14 to the inner pipe 12 along the connecting cones 16. As previously noted, it is preferred to employ Incoloy alloy 903, a nickel, iron, chromium alloy, for the outer "un-prestressed" portions 23 of the inner pipe adjacent the field weld area between the prestressed pipe sections. This alloy has a low thermal stress between 70° F. and −260° F. The coefficient of thermal contraction of this material is nearly constant at $4.4 \times 10^{-6}$ inches per inch per °F. and it has a modulus of elasticity of about $21.5 \times 10^6$ psi.

It will be understood that although the connector cones 16 are shown as connected at one end to the stiffener ring 26 and through the collar 24 to the outer pipe 14 by welding, and are connected at their opposite end to the support structure 36 also by welding, such connections can be achieved by other means such as by bolts, and the like.

From the foregoing, it is seen that the invention provides a novel and improved pipeline system, particularly designed for the transport of cryogenic liquids such as LNG, which comprises the use of dual concentric pipes with connector cones for securing the pipes together in concentric relation, and having an improved joint between one end of the connector cones and the inner or carrier pipe, in the form preferably of a fiber reinforced plastic insulator member, particularly a fiberglass reinforced polyester cylinder, whereby a reduction in stress, particularly in the inner carrier pipe is achieved during cooling to cryogenic, e.g. LNG, temperature, and greater thermal efficiency is achieved by reduction in heat leak between the outer and inner pipes.

The pipeline system of the invention can be designed for placement under water, e.g. in lakes, rivers and the ocean, and under normal soil or permafrost.

While I have described particular embodiments of the invention for purposes of illustration, it will be understood that various changes and modifications can be made therein within the spirit of the invention, and the invention accordingly is not to be taken as limited except by the scope of the appended claims.

What is claimed is:

1. A pipeline system having reduced thermal strain when subjected to low temperatures, comprising a first inner pipe means, a second outer pipe means disposed concentrically about said inner pipe means, and providing an annular space between said inner pipe means and said outer pipe means, a plurality of connector cones disposed in said annular space, each of said cones being connected at one end portion to said outer pipe means, and a plastic axially extending insulating member in the annular space around the inner pipe means and connected at one end to the other end portion of said connector cones and positioned between said other end portion of said connector cones and said inner pipe means, and means connecting the other end of said insulating member to said inner pipe means, said insulating member being mounted in spaced relation to said inner pipe means and having a high coefficient of thermal contraction, high compressive strength, and a high modulus of elasticity.

2. The pipeline system as defined in claim 1, said insulating member being comprised of a resin selected from the group consisting of polyester and epoxy resins.

3. The pipeline system as defined in claim 2, said resin containing an inorganic material selected from the group consisting of glass fibers, boron fibers, calcium carbonate and alumina trihydrate.

4. The pipeline system as defined in claim 1, said insulating member being a fiber reinforced plastic laminate.

5. The pipeline system as defined in claim 1, said inner pipe means and said insulating member being placed in compression, said insulating member and said connector cones transferring the compressive load from said inner pipe means to a tension load in said outer pipe means.

6. The pipeline system as defined in claim 1, said plastic insulating member being in the form of a cylinder positioned in the annular space between said inner and outer pipe means, and mounted coaxially of said inner and outer pipe means.

7. The pipeline system as defined in claim 6, said insulating cylinder having an axial length ranging from about 25% to about 50% of the axial length of said connector cones, and a radial thickness ranging from about 10% to about 25% of the axial length of said cylinder.

8. The pipeline system as defined in claim 6, said cylinder being a fiber reinforced plastic insulating cylinder, said fiber being disposed essentially circumferentially within said cylinder.

9. The pipeline system as defined in claim 6, said cylinder being a fiberglass reinforced polyester resin cylinder having compressive load-carrying capacity, the fiberglass in said cylinder being in the form of a circumferential spiral.

10. The pipeline system as defined in claim 1, including a second thermal insulation means in said annular space between the inner and outer pipe means.

11. The pipeline system as defined in claim 10, said second thermal insulation means being polyurethane foam.

12. The pipeline system as defined in claim 1, said inner pipe means and said stress cones comprised of a nickel steel.

13. A pipeline system having reduced thermal strain when subjected to low temperatures, comprising a plurality of pipe sections connected together to form said pipeline system, each said pipe section including a first inner pipe for passage of a cryogenic liquid therethrough, said inner pipe formed of a metal having high strength characteristics at low temperature, a second outer pipe positioned concentrically around said inner pipe, and providing an annular space between said inner pipe and said outer pipe, a pair of connector cones positioned in said annular space adjacent opposite end portions of each of said pipe sections, said connector cones being composed of a high strength material having high modulus, one end of each of said connector cones being connected to said outer pipe, a fiber reinforced plastic insulator member of substantial axial length connected at one end to the other end of each of said connector cones and positioned between said other end of each of said connector cones and said inner pipe, a support member connecting the other end of said insulator member to said inner pipe, and mounting said insulator member in spaced relation to said inner pipe, and having a high coefficient of thermal contraction, high compressive strength, and a high modulus of elasticity.

14. The pipeline system as defined in claim 13, said insulator member comprised of a resin selected from the group consisting of cast and filled polyester and epoxy resins.

15. The pipeline system as defined in claim 14, said filled resins being filled with an inorganic material selected from the group consisting of chopped fiberglass, calcium carbonate and alumina trihydrate.

16. The pipeline system as defined in claim 13, and including a second thermal insulation positioned in said annular space between said inner and outer pipes, said second thermal insulation having low thermal conductivity.

17. The pipeline system as defined in claim 13, said insulator member being a fiberglass reinforced polyester resin.

18. The pipeline system as defined in claim 13, said insulator member being a fiberglass reinforced polyester resin in the form of a cylinder having compressive load-carrying capacity, the fiberglass in said cylinder being in the form of a circumferential spiral, said cylinder being positioned within said connector cones and disposed in said annular space around said inner pipe and coaxial therewith, said insulator cylinder being under compression.

19. The pipeline system as defined in claim 13, said inner pipe being comprised of nickel steel, and said connector cones comprised of nickel steel or stainless steel.

20. The pipeline system as defined in claim 13, the end portions of the inner pipes of adjacent pipe sections being connected together, and including outer pipe covers positioned between and connected to the outer pipes of adjacent pipe sections.

21. The pipeline system as defined in claim 20, including a second insulation also being disposed in the annular space between said outer pipe covers and said inner pipe, and between adjacent pipe sections.

22. The pipeline system as defined in claim 13, including a field weld between adjacent pipe sections, the inner pipes of adjacent pipe sections having un-prestressed end portions adjacent said field weld, said un-prestressed end portions being composed of a metal having a low thermal stress and a low modulus of elasticity.

23. A pipeline system having reduced thermal strain when subjected to low temperatures, comprising a pipe section including a first inner carrier pipe and a second outer jacket pipe, said outer pipe being disposed concentrically about said inner pipe, and providing an annular space between said inner pipe and said outer pipe, a pair of connector cones positioned in said annular space adjacent opposite end portions of said pipe section, said connector cones being composed of a high strength material having high modulus, the outer large end of said connector cones being connected to said outer pipe, a stiffener ring positioned around and connected to said large end of said connector cones, and a pair of insulator members positioned in said annular space and positioned within said connector cones adjacent opposite end portions of said pipe section, said insulator members each being a fiberglass reinforced polyester resin in the form of a cylinder having compressive load-carrying capacity, the fiberglass in said cylinder being in the form of a circumferential spiral, said cylinders being disposed around and coaxial with said inner pipe and spaced therefrom, a support structure mounted on the outer side of each of said insulator cylinders, the small end of each of said stress cones being connected to said support structure, a ring plate mounted on the opposite inner side of each of said insulator cylinders, said ring plate being disposed around and connected to said inner pipe, said inner pipe between said ring plates being prestressed in compression, and said insulator members and said connector cones transferring said compressive load from said inner pipe to a tension load in said outer pipe.

24. The pipeline system as defined in claim 23, including a plurality of said pipe sections connected together to form said pipeline system, the ends of the inner pipe of said pipe sections being welded to the ends of the inner pipe of adjacent pipe sections, and including outer pipe covers positioned between and connected to the outer pipes at the ends of adjacent pipe sections.

25. The pipeline system as defined in claim 24, including a second thermal insulation positioned in the annular space between the inner and outer pipes of each of said pipe sections, and in the annular space between said outer pipe covers and said inner pipes and between the ends of adjacent pipe sections, said second thermal insulation having low thermal conductivity.

26. The pipeline system as defined in claim 24, said inner pipes comprised of nickel steel, said connector cones comprised of nickel steel, and said second thermal insulation being polyurethane foam.

27. The pipeline system as defined in claim 24, the end portions of said inner pipe of said pipe sections between said ring plates and the weld between adjacent pipe sections being un-prestressed, and said pipe covers being subjected to neither a compressive nor tensile load.

28. The pipeline system as defined in claim 24, said cylinders having an axial length ranging from about 25% to about 50% of the axial length of said connector cones, and the radial thickness of said insulator cylinders ranging from about 10% to about 25% of the axial length of said cylinders.

29. The pipeline system as defined in claim 24, including a support bracket connected to said inner pipe and positioned against said ring plate.

30. The pipeline system as defined in claim 13, said insulator member having a coefficient of thermal contraction ranging from about 0.004 to about 0.010 inches per inch, a compressive strength ranging from 6,000 to about 12,000 psi and a modulus of elasticity ranging from about 800,000 to about 2 million psi.

31. The pipeline system as defined in claim 23, including a plurality of said pipe sections welded together to form said pipeline system, the ends of the inner pipe of said pipe sections being welded to the ends of the inner pipe of adjacent pipe sections, the end portions of the inner pipe of adjacent pipe sections between said ring plate and the weld connecting the ends of the inner pipe of adjacent pipe sections being un-prestressed, said un-prestressed end portions being composed of a metal having low thermal stress and a low modulus of elasticity.

32. The pipeline system as defined in claim 31, said un-prestressed end portions being composed of a nickel, iron, chromium alloy having a coefficient of thermal contraction of $4.4 \times 10^{-6}$ inch per inches per °F., and a modulus of elasticity of about $21.5 \times 10^6$ psi.

* * * * *